(12) United States Patent
Guaraldo

(10) Patent No.: US 6,918,470 B2
(45) Date of Patent: Jul. 19, 2005

(54) ELECTROMAGNETIC BRAKE

(75) Inventor: Denis Guaraldo, Velizy (FR)

(73) Assignee: Messier - Bugatti (FR)

( * ) Notice: Subject to any disclaimer, the term of this patent is extended or adjusted under 35 U.S.C. 154(b) by 0 days.

(21) Appl. No.: 10/760,297

(22) Filed: Jan. 21, 2004

(65) Prior Publication Data

US 2004/0154880 A1 Aug. 12, 2004

(30) Foreign Application Priority Data

Feb. 7, 2003 (FR) .............................................. 03 01456

(51) Int. Cl.⁷ .......................... B60T 13/04; B60T 41/26
(52) U.S. Cl. ..................... 188/171; 188/161; 192/219.4
(58) Field of Search ................................ 188/71.5, 134, 188/171, 173, 156, 158, 161, 162, 163; 192/18 B, 20, 219.4, 223

(56) References Cited

U.S. PATENT DOCUMENTS

| | | | |
|---|---|---|---|
| 4,809,824 A | * | 3/1989 | Fargier et al. ............. 188/72.8 |
| 6,189,661 B1 | * | 2/2001 | Schaffer ...................... 188/157 |
| 6,260,668 B1 | * | 7/2001 | McClanahan ............... 188/71.5 |
| 6,702,069 B2 | * | 3/2004 | Ralea et al. ................ 188/71.5 |
| 2004/0089505 A1 | * | 5/2004 | Audren et al. ............. 188/71.5 |

FOREIGN PATENT DOCUMENTS

| FR | 2 819 469 A1 | 7/2002 |
|---|---|---|
| FR | 2 824 967 A | 11/2002 |

* cited by examiner

*Primary Examiner*—Christopher P. Schwartz
(74) *Attorney, Agent, or Firm*—Sughrue, Mion, PLLC

(57) ABSTRACT

The invention relates to an electromechanical brake comprising a stack of disks and at least one electromechanical actuator having a pusher for applying pressure to the stack of disks in controlled manner, the brake being equipped with a parking device for maintaining pressure on the disks at least while the brake is not fed with electrical current. In the invention, the parking device comprises a resilient member and a selector which is mounted to move between a first position in which the resilient member is mechanically decoupled from the pusher and is maintained in an elastically deformed state to form a potential energy reserve, and a second position in which the resilient member is mechanically coupled to the pusher so that the pusher exerts pressure on the stack of disks under drive from the resilient member.

9 Claims, 2 Drawing Sheets

ELECTROMAGNETIC BRAKE

BACKGROUND OF THE INVENTION

Electromagnetic brakes are known that comprise a stack of disks, one portion of which (rotor portion) is constrained to rotate with the wheel, and another portion of which (stator portion) is prevented from rotating, together with one or more electromechanical actuators, each of which has a pusher for applying pressure to the stack of disks in controlled manner.

For example, reference can be made to Documents FR-A-2 824 967, U.S. Pat. No. 6,189,661, and U.S. Pat. No. 4,809,824.

Such a brake is, in general, equipped with a parking device organized to maintain pressure on the disks at least while the brake is not being powered electrically. The parking device serves to hold the vehicle stationary when it is stopped.

Parking devices for electromechanical brakes are known that comprise controlled means for positively blocking at least one of the actuators equipping the brake so that the pusher of said brake is held stationary in a position in which it is pressed against the stack of disks.

However, such parking devices are unsatisfactory. After intense braking, the component parts of the brake (stack of disks, brake structure, and actuators), which have been subjected to considerable amounts of heat, are in an expanded state. As a result, when the blocking means of the parking device are actuated soon after intense braking, they block the pusher while the brake is in an expanded state.

The coefficient of expansion of the disks is lower than the coefficient of expansion of the metal portions of the brake and of the wheel. The structure of the brake and the blocked pushers form a clamp that clamps the stack of disks, which stack is then progressively compressed during cooling.

That compression might damage the disks and might block the pusher so strongly so that it is then difficult or even impossible to release it.

In order to eliminate that drawback, consideration has been given to modifying the parking device so as to equip it with a sliding member that makes it possible to limit the pressure force delivered by the pusher against the stack of disks to a predetermined value, so that it is possible to cause the pusher to be blocked without any risk, even while the brake is still in the expanded state, the extra force on the stack of disks that is generated by the brake cooling then being absorbed by the sliding member.

It has also been proposed to use resilient means for maintaining a parking force in spite of the thermal expansion of the brake, e.g. Belleville spring washers which are compressed under drive from the motor once the pusher has come into contact with the disks. The compression is maintained because of the irreversibility of the coupling between the motor and the pusher.

But, when the outside temperature increases (e.g. when going from night to day for an aircraft parked on an airport in a desert region), the brake expands again, the faster expansion of the metal portions of the brake and of the wheel causing a reduction in the pressure force, which is undesirable insofar as that force could become insufficient to hold the vehicle stationary on a slope.

OBJECT OF THE INVENTION

An object of the invention is to provide an electromagnetic brake that does not suffer from the above-mentioned drawbacks.

BRIEF DESCRIPTION OF THE INVENTION

In an electromechanical brake of the invention, the parking device comprises a resilient member and a selector which is mounted to move between a first position in which the resilient member is mechanically decoupled from the pusher and is maintained in an elastically deformed state to form a potential energy reserve, and a second position in which the resilient member is mechanically coupled to the pusher so that the pusher exerts pressure on the stack of disks under drive from the resilient member.

The resilient member forms an elastic potential energy accumulator and acts similarly to a hydraulic accumulator in a conventional hydraulic brake.

In a hydraulic brake, the hydraulic accumulator is, in normal mode, hydraulically isolated from the pistons, and is maintained inflated.

In the same way, in normal mode, when the selector is in the first position, the resilient member is mechanically decoupled from the pusher and is maintained in a deformed state.

In a hydraulic brake, in parking mode, the hydraulic accumulator is hydraulically connected to the pistons so that the pressurized fluid contained in the accumulator exerts hydraulic drive on the hydraulic pistons, thereby pressing said pistons against the stack of disks.

Similarly, in parking mode, when the selector is in the second position, the resilient member is mechanically coupled to the pusher so as to exert mechanical drive on said pusher, thereby pressing it against the stack of disks.

In a preferred embodiment of the invention, the resilient member is a spiral spring.

Preferably, said spiral spring has one end fixed, and its other end constrained to rotate with a hub that turns about an axis that coincides with the axis of the outlet shaft of the parking device.

In a first embodiment of the invention, the selector then comprises a plate that is mounted to rotate with the hub and to be movable axially between the first position in which coupling elements on the plate co-operate with corresponding fixed coupling elements, and the second position in which coupling elements on the plate co-operate with corresponding coupling elements carried by the outlet shaft.

Advantageously, the plate is then suitable for being placed in an intermediate axial position in which both of the coupling elements carried by the plate are in engagement with the respective corresponding coupling elements.

In a second embodiment of the actuator, the selector comprises a first plate which is movable axially between a coupling position in which coupling elements on the first plate co-operate with corresponding coupling elements carried by the hub, and a decoupling position in which said coupling elements are disengaged, said selector further comprising a second plate constrained to rotate with the hub and movable between a coupling position in which coupling elements on the second plate co-operate with coupling elements carried by the outlet shaft, and a decoupling position in which said coupling elements are disengaged.

Preferably, at least one of the pairs of coupling elements is of the sliding type.

In a particular aspect of the invention, the parking device is a single module housed in a housing mounted detachably on the actuator.

BRIEF DESCRIPTION OF THE DRAWINGS

The invention will be better understood on reading the following description of various embodiments, with reference to the figures of the accompanying drawings, in which.

DETAILED DESCRIPTION OF THE INVENTION

The invention is described herein with reference to an electromechanical brake for an aircraft, but the invention is applicable to any other type of wheeled vehicle.

Figure 1:
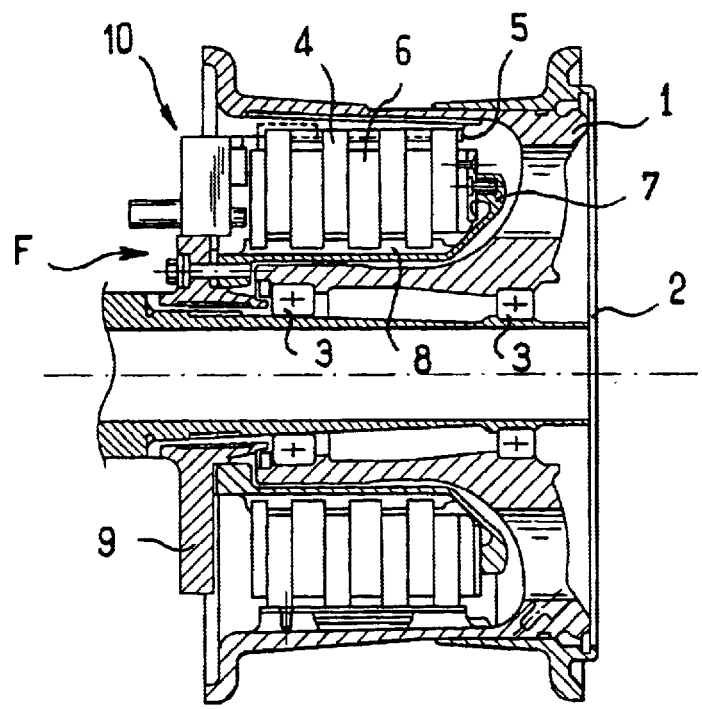
FIG. 1 is a section view of an electromechanical brake of the invention.

As shown in FIG. 1, and in a manner known per se, an aircraft wheel 1 is mounted to rotate on an axle 2 via bearings 3. The wheel 1 is equipped with a brake F comprising a stack of disks made up of rotors 4 which are constrained to rotate with the wheel 1 by means of peripheral keying 5, and of stators 6, which are disposed in alternation with the rotors 4, and which are constrained to rotate with a torsion tube 7 by means of inner keying 8. The torsion tube 7 is screwed to a collar 9 which is threaded over the axle 2 and is prevented from rotating relative thereto so that the stators 6 are prevented from rotating.

The collar 9 carries electromechanical actuators 10 arranged circumferentially, with only one of them being shown.

Figure 2:
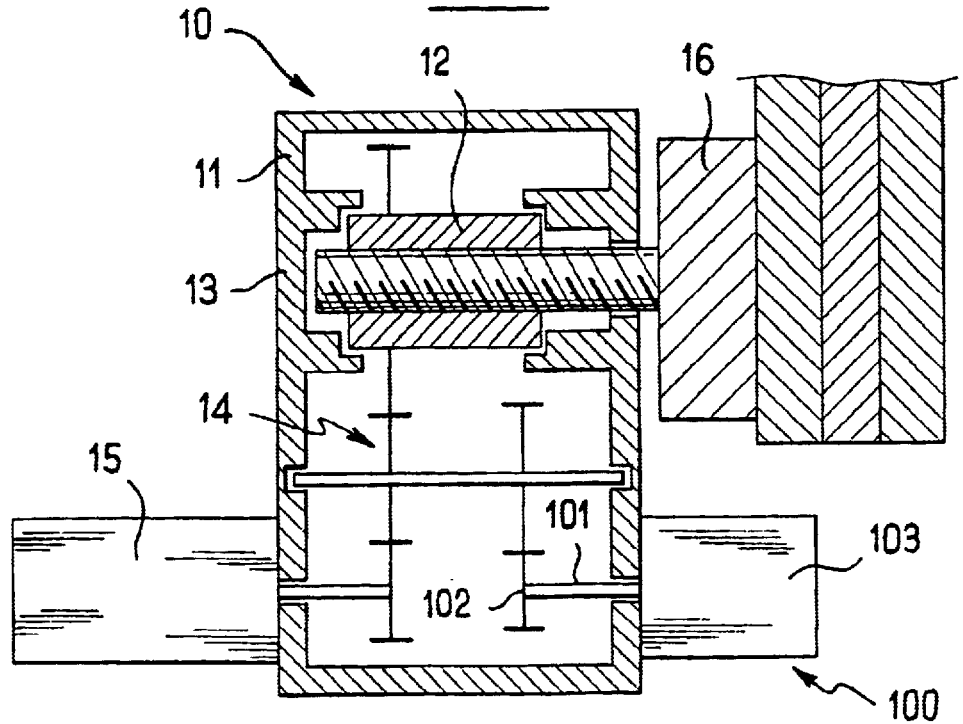
FIG. 2 is a diagrammatic section view of one of the actuators of the brake of FIG. 1.

As shown in FIG. 2, each of the actuators 10 has a housing 11 which is mounted on the collar 9 of the brake F. A nut 12 is mounted to rotate inside the housing 11, and it co-operates with a bolt 13 prevented from rotating relative to the housing 11 by a rotation-preventing device (not shown), so that the nut 12 rotating causes the bolt 13 to move axially.

The housing 11 includes gearing 14 which forms a driving connection between the nut 12 and an electric motor 15 which, in this example, is detachably mounted on the housing 11. The bolt 13 is terminated by a pusher 16 which co-operates with the stack of disks to exert pressure on said stack in response to torque imparted by the electric motor 15.

A parking device 100, designed as a single module in this example, is detachably mounted on the housing 11. The parking device 100 has a housing 103 inside which an outlet shaft 101 is mounted to rotate. The outlet shaft 101 is provided with a sprocket wheel 102 suitable for co-operating with the gearing 14 of the actuator.

Figure 3:
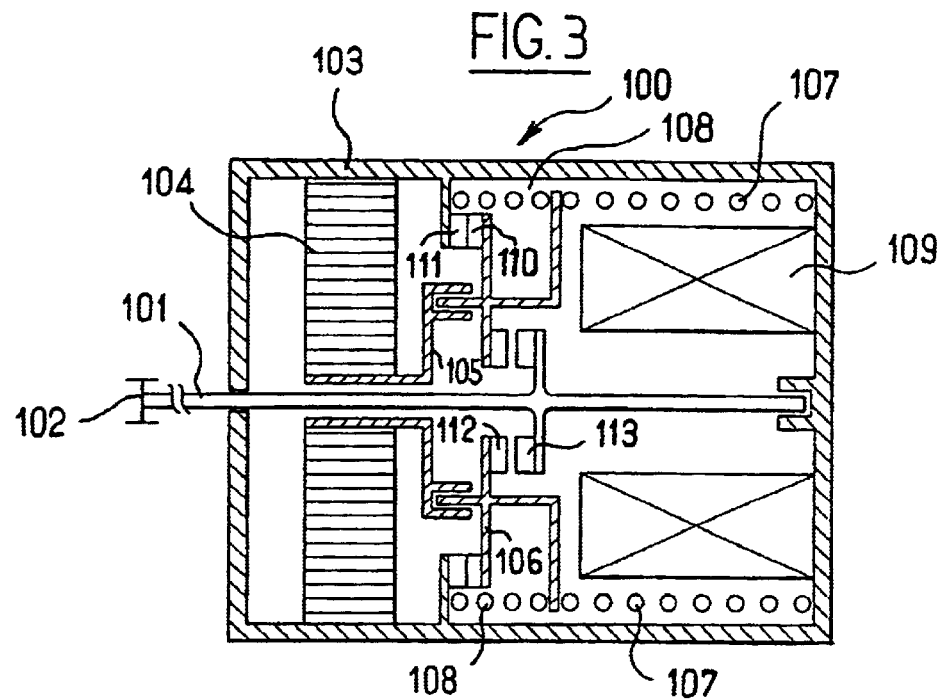
FIG. 3 is a section view of a first parking device equipping the actuator shown in FIG. 2, in a first embodiment of the invention.

In a first embodiment shown in FIG. 3, a spiral spring 104 is disposed inside the housing 103 so that an outer end of the spiral spring 104 is fixed to the housing 103, and an inner end of said spiral spring is secured to a hub 105 mounted to rotate about an axis that coincides with the axis of the outlet shaft 101.

The hub 105 carries a plate 106 which is constrained to rotate with the hub 105 but which can be moved axially therealong under drive from two opposing springs 107, 108 and from an electromagnet 109.

The plate 106 is mounted to move between two axially extreme positions, in which the plate is constrained to rotate either with the housing 103, or with the outlet shaft 101.

For this purpose, on one of its faces, the plate 106 carries coupling elements 110 designed so that, when the plate 106 is in the first axial position (the position shown in the figure), they co-operate with corresponding coupling elements 11 mounted in fixed manner on the housing 103.

On the other of its faces, the plate 106 carries coupling elements 112 designed so that, when the plate 106 is in a second axial position, they co-operate with corresponding coupling elements 112 constrained to rotate with the outlet shaft 101.

When the plate 106 is in the first axial position, co-operation between the coupling elements 110, 111 causes the plate 106, and thus the hub, to be prevented from rotating, so that the spiral spring 104 is held stationary and held in a deformed state.

Also in said first axial position, the coupling elements 112, 113 are separate so that the outlet shaft 101 is free to turn without being subjected to the influence of the spiral spring 104.

When the plate 106 is in the second axial position, co-operation between the coupling elements 112, 113 causes the hub 105 to be constrained to rotate with the outlet shaft 101, so that the outlet shaft 101 is subjected to drive from the spiral spring 104.

The plate can also be placed in an intermediate position between the extreme axial positions, which position is defined by the forces exerted by the opposing springs 107, 108 being in equilibrium. In said intermediate position, the coupling elements 110 & 111 and 112 & 113 are in engagement, so that the outlet shaft 101 is prevented from rotating.

The electromagnet 109 makes it possible to move the plate 106 against the springs 107, 108. Starting from one of the extreme axial positions, a nominal current pulse makes it possible to move the plate 106 into the other one of the extreme positions, whereas a small pulse that is smaller than the nominal pulse, makes it possible to move the plate into the intermediate position.

The intermediate position is a stable equilibrium position, while the extreme axial positions are made stable by using an electromagnet 109 of the bistable type, which makes it possible to keep the plate indefinitely in the extreme axial position that it occupies in the absence of a current pulse.

The parking device 100 operates as follows.

The plate 106 is placed in the first extreme axial position when the actuator is in the normal operating mode, i.e. when the vehicle is activated and when the electric motor 15 is powered and is providing normal braking for the vehicle.

In this position, the outlet shaft 101 is free to turn and thus does not put up any resistance to the outlet shaft of the motor 15 rotating. The parking device is then "transparent" for the drive linkage of the actuator.

When the vehicle is to be held stationary for the purpose of parking it, the electric motor 15 is caused to press the pusher 16 against the stack of disks with a predetermined force, and then a nominal pulse is sent to the electromagnet 109 in order to move the plate 106 into the second extreme axial position.

The spiral spring 104 is then in engagement with the outlet shaft, which is itself in engagement with the gearing 14. Since the coupling between the nut 12 and the bolt 13 is reversible, the pusher 16 is free to move axially under drive from thermal expansion, against the spiral spring 104, the drive from which makes it possible to maintain a pressure force from the pusher 16 on the stack of disks.

The pressure force resulting from the drive from the spiral spring 104 on the pusher 16 is determined firstly by the prestress torque of the spiral spring 104, and secondly by the stiffness thereof.

It is advisable to choose a stiffness for the spiral spring 104 that is quite low, which makes it possible to limit variations in the pressure force in response to the pusher 16 being moved under the effect of thermal expansion.

The prestress torque of the spiral spring can either be set permanently in the factory, or else be modified at will by means of the electric motor.

For this purpose, the electric motor 15 is put into engagement with the spiral spring 104 by moving the plate 106 into the second axial position while the pusher 16 is not in contact with the stack of disks, and the spiral spring 104 is allowed to unwind (optionally while being held by the electric motor 15), and then it is caused to be wound up through a determined number of turns corresponding to the desired prestress, by means of the electric motor 15.

It is also possible to perform this adjustment firstly by measuring the current that needs to be fed to the electric motor 15 in order for said motor to prevent the spiral spring 104 from relaxing. Said current is an estimate of the prestress torque of the spiral spring 104. By then causing the electric motor 15 to turn in one direction or the other, the deformation of the spiral spring 104 is modified until the desired prestress torque is obtained.

Once the adjustment has been performed, the plate 106 is then moved towards the first axial position, so that the spiral spring 104 is held stationary in the deformed state corresponding to the desired prestress torque.

In an advantageous aspect of the invention, by placing the plate 106 in the intermediate position, the outlet shaft 101 is blocked, thereby blocking the entire drive linkage of the actuator 10, and thus preventing the motor 15 from acting on the pusher 16.

The outlet shaft 101 being blocked, which is obtained when the plate 106 is in the intermediate position, constitutes safety means for guaranteeing safety in the event that the electric motor 15 is caused to operate in untimely and undesired manner, e.g. during maintenance work on the brake, or during the impact stage of landing an aircraft, during which stage, it is desirable to avoid any blocking of the associated wheel.

In another advantageous aspect of the invention, the spiral spring 104 may be used to provide back-up braking, in the event of total failure of the electric motor 15. It is then necessary merely to actuate the electromagnet 109 in order to move the plate 106 into the second extreme axial position, so that, by unwinding, the spiral spring 104 takes up slack between the pusher 16 and the stack of disks, and then causes the pusher 16 to apply a pressure force to the stack of disks. The pulse necessary for actuating the electromagnet 109 can advantageously be delivered by a battery, which makes it possible to brake the vehicle even in the event of total failure of its electrical power supply circuits.

The plate 106 thus forms a selector making it possible to place the parking device 100 in one or other of the above-mentioned operating modes, merely by moving it axially under drive from the springs 107, 108 and from the electromagnet 109.

The coupling elements 110 & 111 and 112 & 113 can be of the positive clutch type. In a particular aspect of the invention, at least the coupling elements 112, 113 coupling the plate 106 to the outlet shaft 101 are chosen to be of the sliding type, which makes it possible to limit the torque transmitted by said coupling elements.

This is particularly advantageous, in the event that the spiral spring exceeds its working deformation zone, for preventing the stiffening of the spiral spring resulting from said zone being exceeded from causing too large a force to be applied to the stack of disks.

For example, the coupling elements may be constituted by friction disks, or else by facial teeth of gradient that is sufficiently shallow to enable the plate to slide when the spring imparts an opposing torque greater than a threshold determined by the geometrical shape of the teeth.

Figure 4:
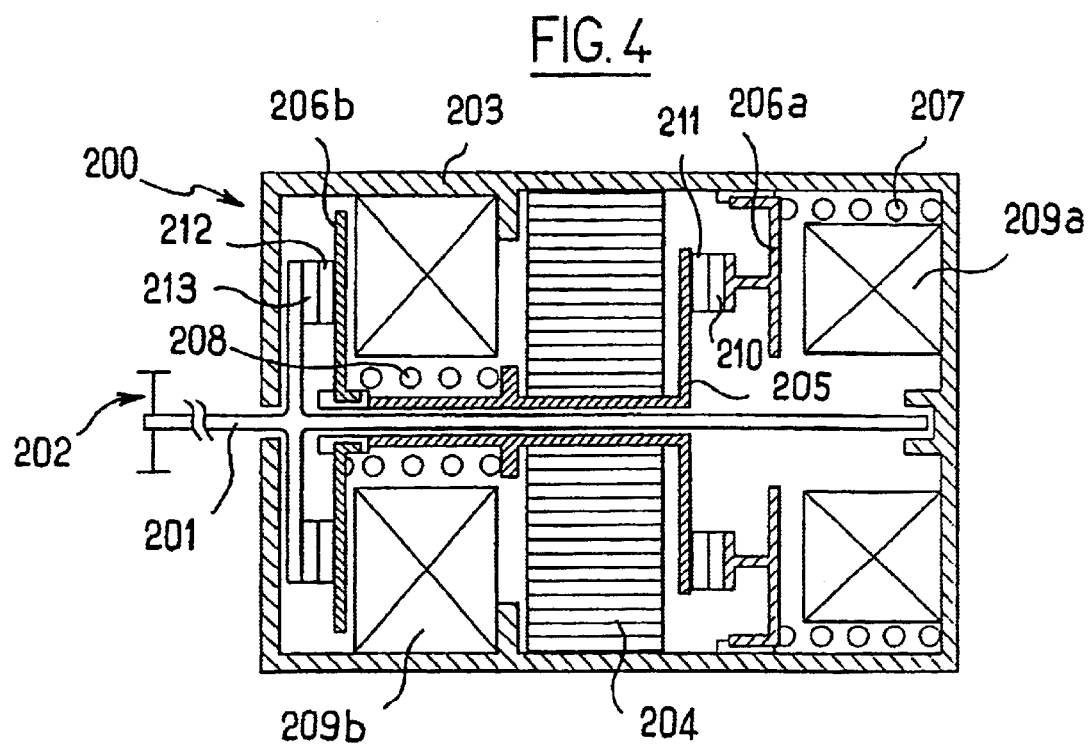
FIG. 4 is a section view of a second parking device equipping the actuator shown in FIG. 2, in a second embodiment of the invention.

In a second embodiment shown in FIG. 4, the parking device 200, which is also implemented as a single module detachably mounted on the actuator 10, has a housing 203 inside which an outlet shaft 201 provided with an outlet sprocket wheel 202 is mounted to turn.

A spiral spring 204 is mounted inside the housing and has an outer end fixed to the housing 203 and an inner end secured to a hub 205 mounted to rotate about an axis that coincides with the axis of the outlet shaft 201.

The selector has a first plate 206a which slides inside the housing 203 while being prevented from rotating relative to said housing.

The plate 206a is mounted to move between two axial positions, under drive from a first electromagnet 209a against a spring 207.

The first plate 206a carries coupling elements 210 which are designed so that, when the plate 206a is in a coupling axial position, they co-operate with corresponding coupling elements carried by the housing 203 (as shown). In the other of the axial positions, the coupling elements are separated.

The selector also has a second plate 206b which is constrained to rotate with the hub 205 and which can slide axially relative thereto.

The second plate 206b is mounted to move between two axial positions under drive from a second electromagnet 209b against a spring 208.

The second plate 206b carries coupling elements 212 which are designed so that, when the second plate 206b is in a coupling axial position, they co-operate with corresponding coupling elements 213 carried by the outlet shaft 201 (as shown). In the other of the positions, the coupling elements are separated.

The above-mentioned parking device operates as follows.

When the vehicle is in normal braking mode, the first plate 206a is placed in the coupling position, while the second plate 206b is in the decoupling position.

In this way, the outlet shaft 201 is not subjected to the influence of the spiral spring 204, while said spring is held in a deformed state.

When the vehicle is in parking mode, the first plate 206a is placed in the decoupling position, while the second plate 206b is placed in the coupling position.

In this way, the outlet shaft is connected to the spiral spring 204, which spring is free to wind up or to unwind in response to the movement of the pusher 16.

It is possible to implement an adjustment mode for adjusting the prestress torque of the spiral spring 204, by placing the two plates 206a, 206b in the above-described positions while the pusher is not in contact with the stack of disks. The spiral spring 204 can thus unwind or be wound up by the electric motor 15.

It is also possible to implement a locking mode for locking the actuator, by placing the two plates 206a and 206b in the coupling position.

In this way, the hub 205 is held stationary, thereby holding the outlet shaft 201 stationary, and thus holding the actuator as a whole stationary.

The electromagnets 209a and 209b are of the bistable type, so that the two extreme axial positions of each of the plates 206a, 206b are stable positions. It is then necessary merely for an electrical pulse to be delivered to the electromagnet in question in order to move a plate from one axial position to the other.

The coupling elements 212, 213 may be chosen to be of the sliding type in order to protect the stack of disks if the spiral spring 204 comes to work outside its working deformation zone.

The invention is not limited to the above-described particular embodiments, but rather it covers any variant lying with the ambit defined by the claims.

In particular, although in the embodiments shown, each actuator is equipped with a parking device, it is possible, within the ambit of the invention, to equip only some of the actuators with parking devices.

Although in the embodiments shown each parking device is associated with a single actuator, it is possible to make provision for each parking device to co-operate with a plurality of actuators.

Although in the examples shown the parking device is a single module that is detachably mounted on the actuator, the parking device could be incorporated into the actuator.

Although in the examples shown the resilient member is a spiral spring, the invention also covers parking devices whose resilient members comprise helical springs, flexible blades, or any other mechanical elements suitable for storing elastic potential energy.

Although in the examples shown the selector comprises one or more plates that can be moved axially under drive from springs or from electromagnets, any other type of selector can be considered, whether it is controlled electrically, mechanically, or in some other way.

What is claimed is:

1. An electromechanical brake comprising a stack of disks and at least one electromechanical actuator having a pusher for applying pressure to the stack of disks in controlled manner, the brake being equipped with a parking device for maintaining pressure on the disks at least while the brake is not fed with electrical current, wherein the parking device comprises a resilient member and a selector which is mounted to move between a first position in which the resilient member is mechanically decoupled from the pusher and is maintained in an elastically deformed state to form a potential energy reserve, and a second position in which the resilient member is mechanically coupled to the pusher so that the pusher exerts pressure on the stack of disks under drive from the resilient member.

2. An electromechanical brake according to claim 1, wherein the resilient member is a spiral spring.

3. An electromechanical brake according to claim 1, wherein the parking device is a single module housed in a housing mounted detachably on the actuator.

4. An electromechanical brake comprising a stack of disks and at least one electromechanical actuator having a pusher for applying pressure to the stack of disks in controlled manner, the brake being equipped with a parking device for maintaining pressure on the disks at least while the brake is not fed with electrical current, wherein the parking device comprises a resilient member and a selector which is mounted to move between a first position in which the resilient member is mechanically decoupled from the pusher and is maintained in an elastically deformed state to form a potential energy reserve, and a second position in which the resilient member is mechanically coupled to the pusher so that the pusher exerts pressure on the stack of disks under drive from the resilient member, wherein the resilient member is a spiral spring, and wherein the spiral spring has one end fixed, and its other end constrained to rotate with a hub that turns about an axis that coincides with the axis of the outlet shaft of the parking device.

5. An electromechanical brake according to claim 4, wherein the selector comprises a plate that is mounted to rotate with the hub and to be movable axially between the first position in which coupling elements on the plate co-operate with corresponding fixed coupling elements, and the second position in which coupling elements on the plate co-operate with corresponding coupling elements carried by the outlet shaft.

6. An electromechanical brake according to claim 5, wherein the plate is suitable for being placed in an intermediate axial position in which both of the coupling elements carried by the plate are in engagement with the respective corresponding coupling elements.

7. An electromechanical brake according to claim 5, wherein at least one of the pairs of coupling elements is of the positive clutch type.

8. An electromechanical brake according to claim 5, wherein at least one of the pairs of coupling elements is of the sliding type.

9. An electromechanical brake according to claim 4, wherein the selector comprises a first plate which is movable axially between a coupling position in which coupling elements on the first plate co-operate with corresponding coupling elements carried by the hub, and a decoupling position in which said coupling elements are disengaged, said selector further comprising a second plate constrained to rotate with the hub and movable between a coupling position in which coupling elements on the second plate co-operate with coupling elements carried by the outlet shaft, and a decoupling position in which said coupling elements are disengaged.

* * * * *